March 8, 1949. C. E. WEISNER ET AL 2,464,108
CIGARETTE CUTTING MACHINE
Filed April 26, 1945 2 Sheets-Sheet 1
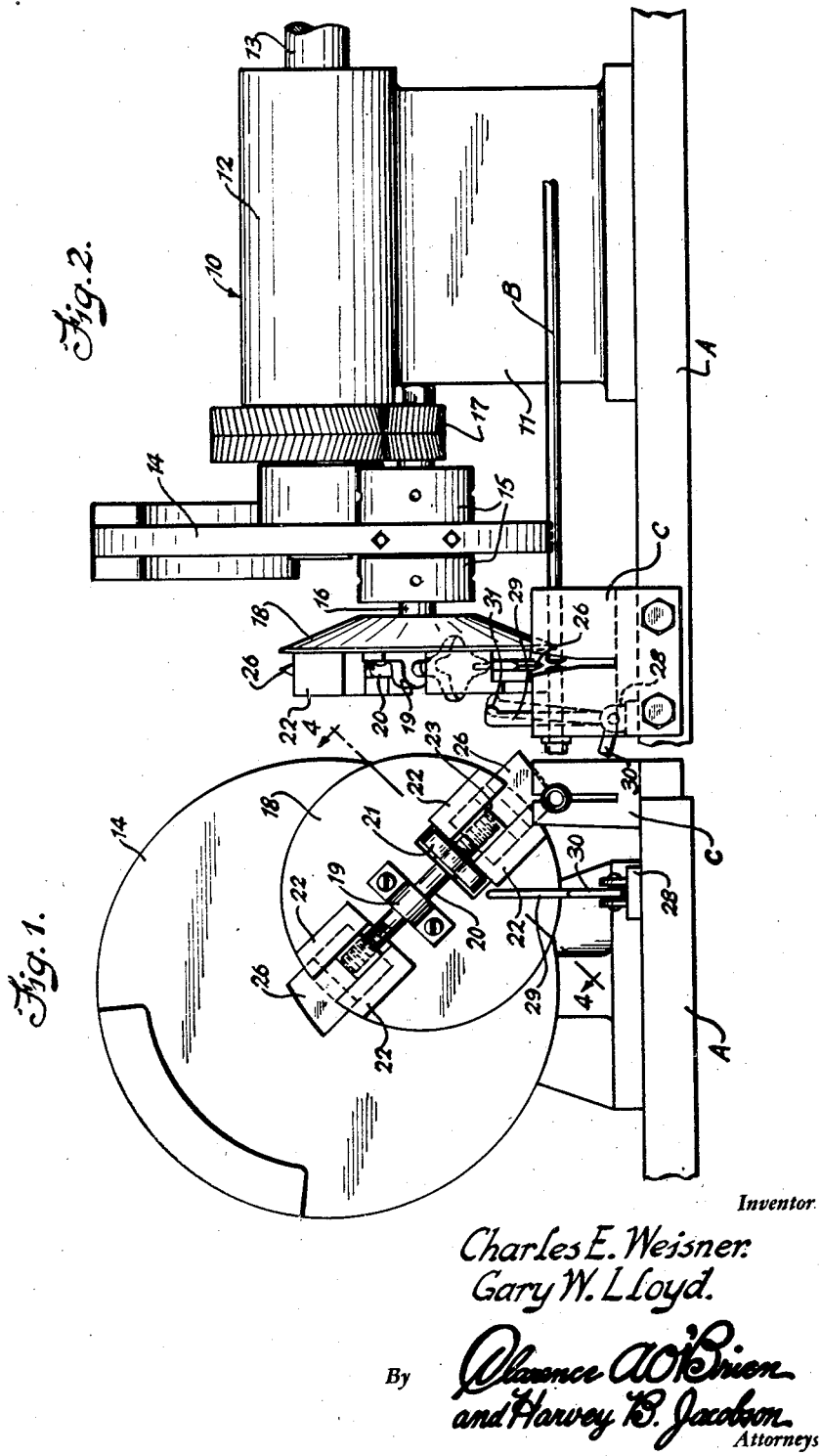
Inventor
Charles E. Weisner.
Gary W. Lloyd.
By Clarence A. O'Brien
and Harvey B. Jacobson
Attorneys March 8, 1949.   C. E. WEISNER ET AL   2,464,108
CIGARETTE CUTTING MACHINE
Filed April 26, 1945   2 Sheets-Sheet 2
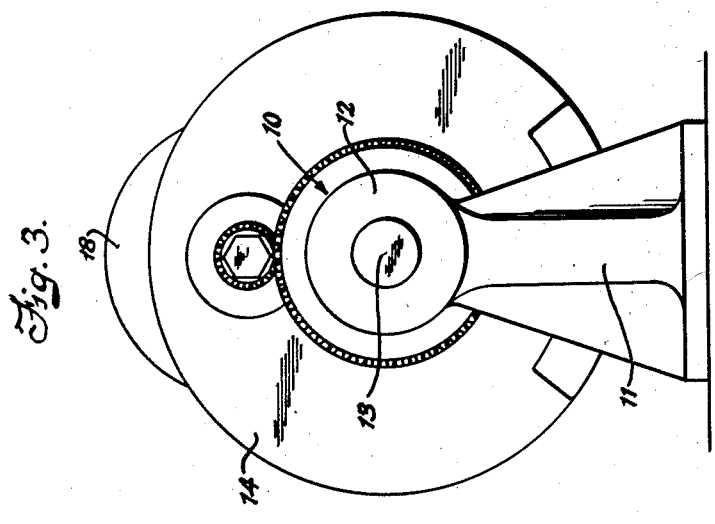
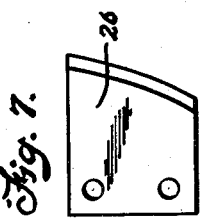
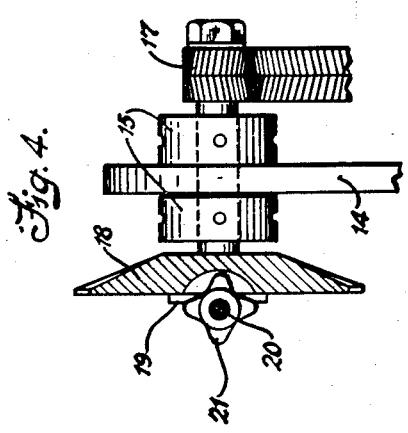
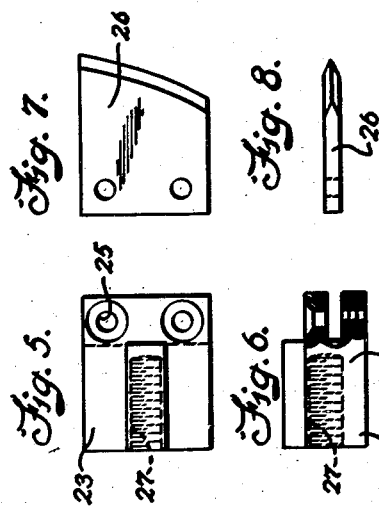
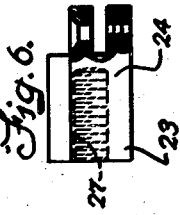
Inventor
Charles E. Weisner.
Gary W. Lloyd.
By
Clarence A. O'Brien
and Harvey B. Jackson
Attorneys Patented Mar. 8, 1949

2,464,108

UNITED STATES PATENT OFFICE 2,464,108

CIGARETTE CUTTING MACHINE

Charles E. Weisner, Durham, and Gary W. Lloyd, Hillsboro, N. C.

Application April 26, 1945, Serial No. 590,352

1 Claim. (Cl. 146—101)

This invention relates to improvements in cigarette cutting machines and has for its object the rapid and clean cutting of the long lengths of tobacco filled rods produced by a cigarette machine.

Another object is to cut the cigarette rod into proper lengths without arresting its progress from the machine upon which it is being produced.

The above and other objects may be accomplished by employing this invention which embodies among its features a head supporting at one end a fixed gear with a shaft rotatably mounted in the head and carrying adjacent the end of the head carrying the fixed gear a rotating disk in which a cutter shaft is mounted to rotate and travel in an orbit concentric with the axis of the drive shaft disk, a cutter head fixed to one end of the cutter shaft and a pinion at the opposite end of the cutter shaft for meshing engagement with the fixed gear of the head, a screw extending perpendicular to the axis of the cutter head and carrying a star wheel by which it may be rotated, one end of the screw entering a blade carrier and a blade mounted in the carrier and adapted to be moved radially of the cutter head by means of the screw.

Other features include means for rotating the star wheel and advancing the blade into cutting position while the machine is in operation.

In the drawings—

Figure 1 is an end view of a cigarette cutting machine embodying this invention.

Figure 2 is a front view of the machine.

Figure 3 is an end view showing the machine from the end opposite that shown in Figure 1.

Figure 4 is a sectional view taken on the line 4—4 of Figure 1.

Figure 5 is a plan view of the blade holder.

Figure 6 is an edge view of Figure 5.

Figure 7 is a plan view of a cutting blade, and

Figure 8 is an edge view of Figure 7.

Referring to the drawings in detail a machine head designated generally 10 comprising a standard 11 carrying at its upper end a cylindrical body 12 is provided with a longitudinally bore in which the shaft 13 is mounted for rotation. This shaft carries at one end a suitable drive gear or sprocket (not shown) and at its opposite end a disk 14 carrying suitable bearings 15 in which a cutter shaft is mounted for rotation. It is to be noted that the cutter shaft 16 is mounted eccentric to the longitudinal axis of the shaft 13 and disk 14 so that as the disk is rotated the shaft 16 will travel in an orbit concentric with the axis of the shaft 13 and disk 14. Secured to the end of the shaft 16 and meshing with the fixed gear on the head 10 is a pinion 17 which is arranged to rotate the shaft 16 about its own axis as it revolves through the circular orbit concentric with the drive shaft 13. Secured to the end of the shaft 16 opposite the pinion 17 is a cutter head 18 which takes the form of a disk and attached to the outer face of the head 18 is a socket 19 in which a screw 20 is rotatably mounted. As shown in Figure 1, the screw 20 carries a star wheel 21 by means of which it may be rotated in its socket and attached to the outer face of the head 18 are guides 22 in which blade carriers 23 are slidably mounted. The blade carriers 23 are best illustrated in Figures 5 and 6 and each comprises a bifurcated body member 24 pierced by openings 25 to receive attaching screws by means of which the blade 26 illustrated in Figures 7 and 8 is secured in the holder. Formed in the end of the blade holder body 24 opposite the bifurcated end is an internally screw-threaded socket 27 for the reception of the threaded end of the screw 20 previously mentioned.

Pivotally mounted in a bracket 28 which is fixed to the table A to which the head 10 is secured is a lever 29 carrying a control finger 30 by means of which it may be moved toward or away from the cutter head 18 as illustrated in Figure 1. The upper end of the lever is provided with a dog 31 which when the control finger is lifted moves into the path of movement of the star wheel 21 so that as the star wheel moves in its circular orbit concentric with the axis of the shaft 13 and disk 14 it will be rotated in a direction to cause the screw 20 to advance the cutter blades and hence facilitate adjustment of the blades during the running of the cutter.

The operation is as follows. Upon rotating the shaft 13 the disk 14 will be rotated so as to cause the shaft 16 to travel in a concentric orbit about the axis of the shaft 13 and disk 14. Due to the meshing of the gear 17 with the fixed gear on the head 10 the shaft 16 will be rotated about its own axis thus driving the head 18 so as to bring the knives 26 periodically into cutting position. The cigarette rod B is fed through the usual ledger C which, as shown in Figure 2 is slotted to receive a knife during the cutting operation. Due to the speed of rotation of the head 18 it will be seen that each knife is but momentarily in contact with the cigarette rod B and hence no retardation of the advance of the rod through the ledger will be experienced.

While in the foregoing there has been shown and described the preferred embodiment of this invention it is to be understood that minor changes in the details of construction, combination and arrangement of parts may be resorted to without departing from the spirit and scope of the invention as claimed.

What we claim is:

In a cigarette cutter, a rotary cutterhead, a pair of blade holders mounted on one face of said cutterhead in diametrically spaced relation for movement radially of said head, said blade holders having aligned oppositely screw-threaded openings entering their opposed ends, a stem mounted on the cutterhead to rotate about an axis which aligns with the axis of the aligned openings in the blade holders, threads on the stem adjacent opposite ends thereof threadedly engaging the threads in the openings, means fixed to the stem between the blade holders to rotate the stem and advance or retract the blade holders relative to the head and blades removably mounted in the ends of the blade holders remote from the screw-threaded openings, the cutting edges of the blades being disposed at the ends thereof remote from the blade holders and projecting beyond the periphery of the cutterhead.

CHARLES E. WEISNER.
GARY W. LLOYD.

REFERENCES CITED

The following references are of record in the file of this patent:

UNITED STATES PATENTS

| Number | Name | Date |
|---|---|---|
| 1,888,774 | Rundell | Nov. 22, 1932 |
| 1,936,278 | Hoodydonk | Nov. 21, 1933 |

FOREIGN PATENTS

| Number | Country | Date |
|---|---|---|
| 322,212 | Great Britain | Nov. 28, 1929 |
| 377,064 | Great Britain | July 21, 1932 |